H. KALLER.
Grain Binder.
No. 28,584.
Patented June 5, 1860.
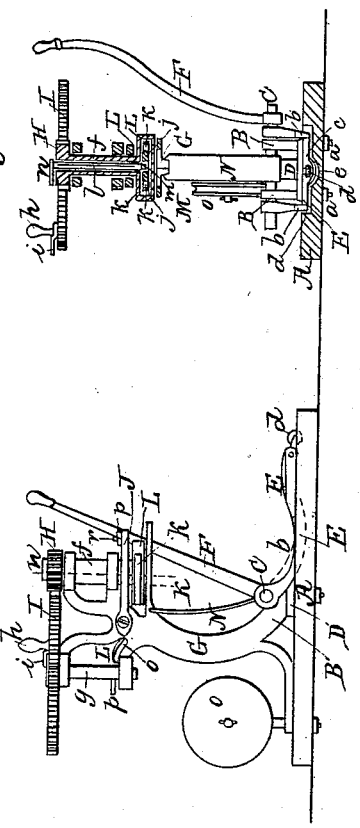

UNITED STATES PATENT OFFICE.

HERMANN KALLER, OF PERRY, ILLINOIS.

IMPROVEMENT IN GRAIN-BINDERS.

Specification forming part of Letters Patent No. 28,584, dated June 5, 1860.

*To all whom it may concern:*

Be it known that I, HERMANN KALLER, of Perry, in the county of Pike and State of Illinois, have invented a new and Improved Grain-Binder; and I do hereby declare that the following is a full, clear, and exact description of the same, reference being had to the accompanying drawing, making a part of this specification, in which—

Figure 1 represents a side elevation of this invention; Fig. 2, a front elevation of the same, partly in section; and Fig. 3, a plan or top view of the same.

Similar letters of reference in the three views indicate corresponding parts.

This invention consists, first, in combining with vibrating curved arm or arms two rotary shafts, connected by gear-wheels, and furnished with suitable wipers and cams, in such a manner that by operating the curved arm the grain is held, and by rotating the shafts the wire is cut and twisted around the grain, leaving the gavel in complete order; second, in the arrangement of a dog in combination with the clamp that serves to retain the end of the wire, for the purpose of more effectually confining the wire in said clamp; third, in the combination, with a rotary spring-catch, of a two-armed fork, embracing a circular or oval space, for the purpose of guiding the wire while being twisted.

To enable those skilled in the art to make and use my invention, I will proceed to describe its construction and operation with reference to the drawing.

A represents a platform, made of wood or any other material, as may be deemed most desirable. Secured to this platform by means of nuts $a$ are the standards B, which form the bearings for a rock-shaft, C. The nuts $a$ screw on the lower ends of the standards B, which, by passing through a flange, D, serve at the same time to fasten the latter.

The rock-shaft C carries the curved vibrating arm E, and a hand-lever, F, is rigidly attached to one of its ends. The arm E consists of two parts, $b\ b$, united by cross-bars $c$, at such a distance apart as the length of the grain to be bound will allow. The uppermost of the cross-bars $c$ is provided with a roller, $d$, which serves as a guide for the wire. The lower end of the arm E is curved, in order to give to the sheaves the proper form, and if said arm is turned down it rests in a recess, $e$, in the platform A, so that the grain can be raked into the curved part of the arm without obstruction. When the arm E is raised it confines the grain between it and a flat spring, N, which serves to confine the grain, allowing at the same time sufficient play, so as to adapt itself to the varying quantity of grain that may be raked up at one time.

The flange D supports the standard G, which is furnished with suitable arms and sockets to form the bearings for two vertical shafts, $f\ g$, which bear the gear-wheels H I. The gear-wheel I is operated by a handle, $h$, and it is furnished with a wiper, $i$, that projects somewhat beyond the periphery of the wheel. The shaft $f$ of the wheel H passes through the clamp J, which serves to retain the end of the wire, and secured to its lower end is the rotary spring-catch K. This catch consists of two jaws, $j$, arranged in the interior of the rotary disk, and forced together by a spring, $k$. The shaft $f$ is hollow, and a rod, $l$, carrying at its lower end a dog, $m$, and at its upper end a cam, $n$, passes through the same. The dog $m$ is situated between the two jaws $j$ of the rotary spring-catch K, and it is actuated by means of the wiper $i$ in the wheel I coming in contact with the cam $n$ on the rod $l$.

The wire, which is retained by the clamp J, is cut off by the action of shears L, which are attached to a lever, $o$, that is actuated by a cam, $p$, on the shaft $g$ of the wheel I, and the wire is retained in said clamp by means of a dog, $q$, the shape of which is such that it allows of the wire being entered, but it opposes the wire being slipped out. In order to effect this the point of said dog projects beyond the edge of the jaw, to which it is fastened, and it is allowed to turn in one direction far enough to let the wire slip beyond its point; but if the wire bears on its other side, a stop, $r$, on the side of the jaw to which the dog is attached prevents its point passing beyond the edge of said jaw, and the wire is confined in the most effectual manner.

The spring-catch K rotates over a two-armed fork, M, and the two arms are curved, so as to embrace a circular space that forms a guide for the wire while being twisted. The wire is kept on a spool, O, on the rear end of the platform A, and its end is drawn over the roller d on the upper cross-bar of the arm E, as clearly shown in Fig. 1, and the end of the wire is confined in the clamp J. That portion of the wire between the roller d and spool O is bent up in front of the spring N, and it is now confined on a second place in the clamp J, as clearly shown in Fig. 1.

The operation is as follows: Whenever a sufficient quantity of grain has been raked on the platform A, the arm E is raised and the ends of the wire are passed through the spring-catch K. By imparting to the gear-wheels H and I a rotary motion, by means of the handle h, the wire is cut off, leaving that end of the same which connects with the spool in the clamp J, and the two ends which have been produced by the operation of cutting, and which have previously been passed through the spring-catch K, are twisted by the rotary motion imparted to the shaft f. After having completed one revolution, the wiper i, by coming in contact with the cam n, opens the spring-catch K, and the wire is released.

It will be noticed that the wheel I is considerably larger than the wheel H, so that one revolution of the former wheel produces several revolutions of the latter, and that the wire is twisted together several times before it is released by the action of the wiper i on the cam n.

The gavel, after having thus been bound, is taken from the arm E, the wire is adjusted, and the arm is turned down again, ready for a new charge.

The operation of my grain-binder is very simple, and all its parts are so constructed that it cannot get out of order very easily, and that it can be understood and used without difficulty.

What I claim as new, and desire to secure by Letters Patent, is—

1. The arrangement of two rotary shafts, $f g$, with the gear-wheels H I, wiper $i$, and cams $n$, in combination with the shears L, and with vibrating curved arm E, constructed and operating as and for the purpose described.

2. The arrangement of the dog $g$ in combination with the clamp J, constructed and operating substantially as and for the purpose specified.

3. The combination, with the rotary spring-catch K, of the two-armed fork M, substantially in the manner and for the purpose described.

HERMANN KALLER.

Witnesses:
J. K. CLEVELAND,
A. S. WHITAKER.